(12) United States Patent
Trapasso

(10) Patent No.: US 6,658,326 B2
(45) Date of Patent: Dec. 2, 2003

(54) NOISE REDUCTION SYSTEM AND METHOD

(75) Inventor: David J. Trapasso, Bloomfield, NY (US)

(73) Assignee: Delphi Technologies, Inc., Troy, MI (US)

(*) Notice: Subject to any disclaimer, the term of this patent is extended or adjusted under 35 U.S.C. 154(b) by 462 days.

(21) Appl. No.: 09/790,834

(22) Filed: Feb. 22, 2001

(65) Prior Publication Data

US 2001/0037158 A1 Nov. 1, 2001

Related U.S. Application Data

(60) Provisional application No. 60/187,783, filed on Mar. 8, 2000.

(51) Int. Cl.[7] .............. G05B 13/00; G05B 15/00; G05B 21/00; G05D 23/00; G01M 1/38
(52) U.S. Cl. .............. 700/280; 700/279; 700/28; 700/55; 700/275; 702/56; 73/570; 73/593; 73/649; 73/660; 181/168; 181/200; 181/240; 181/252; 375/254; 375/344; 375/345; 375/350; 381/317; 381/86; 381/94.1
(58) Field of Search .............. 700/28, 280, 55, 700/279, 275; 702/56, 191–195; 73/570, 593, 649–660; 181/168, 171, 207, 200, 240–241, 252; 375/254, 350, 345, 344; 381/317, 86, 94.1

(56) References Cited

U.S. PATENT DOCUMENTS

| 5,563,913 A | * | 10/1996 | Akagiri et al. .............. 375/243 |
| 5,657,401 A | * | 8/1997 | De Haan et al. ............ 382/275 |
| 5,757,938 A | * | 5/1998 | Akagiri et al. ................ 381/98 |
| 6,487,458 B1 | * | 11/2002 | Trapasso ..................... 700/28 |

* cited by examiner

*Primary Examiner*—Ramesh Patel
(74) *Attorney, Agent, or Firm*—Patrick M. Griffin

(57) ABSTRACT

A noise reduction system reduces noise associated with an input signal provided to a control system, while substantially minimizing the adverse affect on the responsiveness and stability of the control system. The noise reduction system includes a processor, a memory subsystem and processor executable code. The processor executable code causes the processor to perform a number of steps. Initially, the processor determines an input signal level of an input signal at an input of a noise reduction system. Next, the processor determines an output signal level of an output signal at an output of the noise reduction system. The processor then determines a magnitude of a difference signal which is the difference between the input signal level and the output signal level. When the magnitude of the difference signal is less than a predetermined noise limit, the input signal is provided to an input of a control system. When the magnitude of the difference signal is greater than or equal to the predetermined noise limit, the output signal is provided to the input of the control system.

27 Claims, 4 Drawing Sheets

NOISE REDUCTION SYSTEM AND METHOD

CROSS-REFERENCE TO RELATED APPLICATION

This application claims priority based on U.S. Provisional Patent Application Ser. No. 60/187,783, entitled "DECREASED PHASE LAG FILTER," by David J. Trapasso, filed Mar. 8, 2000, the disclosure of which is hereby incorporated by reference.

TECHNICAL FIELD

The present invention is generally directed to a control system and, more specifically, to a noise reduction system for reducing noise associated with an input signal provided to the control system.

BACKGROUND OF THE INVENTION

Control systems have been implemented in a wide variety of industrial and automotive applications. For example, control systems have been implemented within motor vehicles to control various subsystems of a motor vehicle. In many of these subsystems (e.g., a powertrain control module), feedback loops are often implemented to provide accurate control of the subsystem. In order to prevent noise from affecting a particular control system, low pass (LP) filters (i.e., integrators) are often utilized to reduce noise present on a sensor input signal. However, a low pass filter generally adds a phase lag to the input signal, which may reduce the responsiveness of the control system.

In automotive type systems, many of the noise sources are electrical in nature and may be caused by load switching, ignition systems and exhaust gas recirculation (EGR) coils, to name a few noise sources. Traditionally, automotive noise has been reduced by: shielding a given sensor, utilizing twisted wire pairs and/or shielded wires, implementing differential amplifiers to cancel common mode noise and/or providing a low pass (LP) input filter to filter the noise.

Two metrics that are generally utilized to provide an indication of the stability of a control system are gain margin (GM) and phase margin (PM). The difference between +/−180 degrees and the phase of the control system, at unity gain (i.e., 0 dB), is the phase margin of the control system. The gain margin of a control system is the additional gain that is required to provide unity gain at a phase crossover frequency. For stability reasons, it is desirable to design a control system with a relatively high PM or GM within its designed operating frequency range. However, at some frequencies, eventually all control systems tend to become unstable. A measure of the usable frequency range of a given control system is indicated by its bandwidth (BW). A control system that is subject to noise that is not eliminated in some fashion may produce a false reaction if the control system treats the noise as a system disturbance.

Therefore, it is generally desirable to eliminate noise on an input to the control system such that the noise does not detrimentally affect the operation of the control system. However, common techniques such as adding a LP filter between a sensor and an input of the control system may, as previously discussed, introduce an increased phase lag, which, in turn, can reduce the responsiveness of the control system and may cause the control system to become unstable.

For example, a noise reduction system that samples at a rate of one millisecond and averages twenty samples provides an input signal to the control system that is delayed by twenty milliseconds. Delaying the input signal is generally undesirable as a slow response time typically decreases the bandwidth of a given control system. In systems that require a faster response, one solution has been to implement a processor that can sample at a higher rate. For example, a processor that can take a sample every fifty microseconds can complete twenty samples in one millisecond. However, this requires faster, more expensive hardware, which tends to increase power consumption and heat dissipation, which may also affect system reliability. Further, such systems may not adequately function if the noise duration is relatively long. For example, if the noise spike in the above example is two milliseconds long, sampling at a faster rate merely averages the noise.

What is needed is a noise reduction system that reduces noise associated with an input signal that is provided to a control system that also substantially minimizes the adverse affect on the responsiveness and stability of the control system. It is also desirable to provide such a noise reduction system for use in a motor vehicle.

SUMMARY OF THE INVENTION

The present invention is directed to a noise reduction system for reducing noise associated with an input signal provided to a control system that also substantially minimizes the adverse affect on the responsiveness and stability of the control system. The noise reduction system includes a processor, a memory subsystem and processor executable code. The processor executable code causes the processor to perform a number of steps. Initially, the processor determines a level of an input signal at an input of the noise reduction system. Next, the processor determines a level of an output signal at an output of the noise reduction system. The processor then determines a magnitude of a difference signal that provides the difference between the input signal level and the output signal level. When the magnitude of the difference signal is less than a predetermined noise limit, the input signal is provided to an input of a control system. When the magnitude of the difference signal is greater than or equal to the predetermined noise limit, the output signal is provided to the input of the control system.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
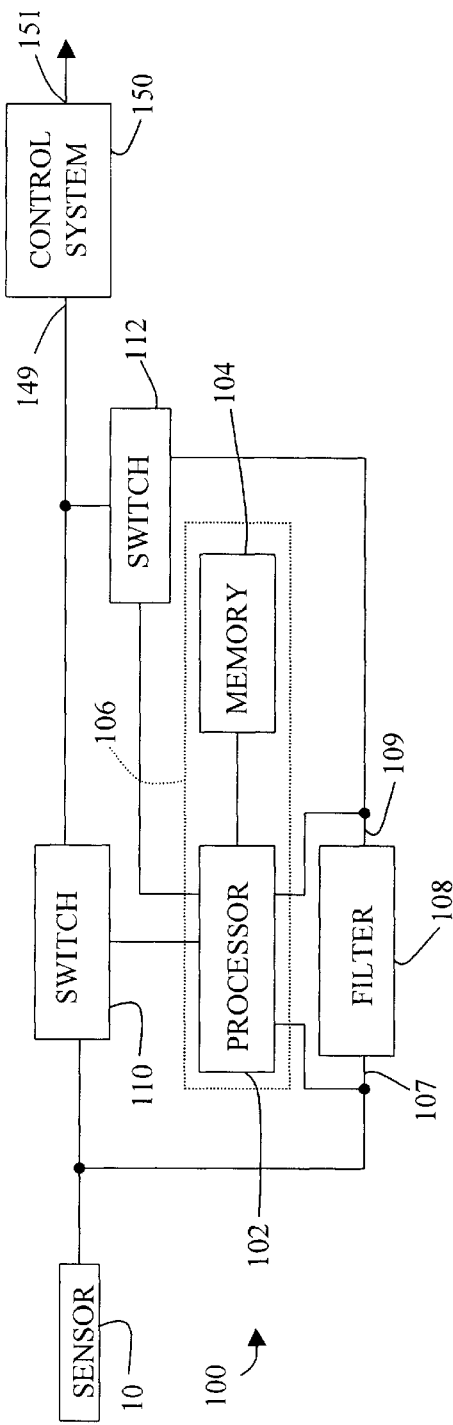
FIG. 1 is an electrical block diagram of a noise reduction system, according to one embodiment of the present invention.

An automotive noise reduction system, according to an embodiment of the present invention, is capable of determining an input signal level at an input of the noise reduction system. The noise reduction system then determines an output signal level at an output of the noise reduction system. More specifically, the output signal level at the output of the noise reduction system is essentially the output result of a conventionally filtered input signal. The noise reduction system then determines the difference between the input signal level and the output signal level. When the magnitude of the difference signal is less than a user defined noise tolerance limit, the noise reduction system provides the input signal to an input of the control system. However, when the magnitude of the difference signal is greater than or equal to the user defined noise tolerance limit, the noise reduction system provides the output signal (i.e., a digital or analog filtered signal) to the input of the control system. According to another embodiment of the present invention, the number of samples taken of the output signal is based upon the magnitude of the difference signal.

The user specified predetermined noise limit may be defined in a number of ways. For example, the limit may be based on a percentage of the output signal (filtered value), a percentage of full scale or a fixed absolute value. If a control system has a higher tolerance to noise as the input signal level increases, using a percentage of the filtered value may decrease the phase lag introduced to the control system. While the discussion herein is primarily directed to implementing a simple low pass (LP) filter in hardware or software, the techniques according to the present invention can be applied to a wide variety of different LP filter types (e.g., Butterworth, Chebychev, etc.).

According to the present invention, the amount of phase lag provided by the noise reduction system depends on the nature of the noise, since some portion of the input signal provided to the control system is normally filtered. When the noise on an input sensor signal is sporadic, the noise reduction system provides an unfiltered sensor signal to the input of the control system when the noise level is below a predetermined noise limit. It will be appreciated that in a conventional filter arrangement all input signals are filtered (i.e., phase lagged), even when noise is not present on the input signal. At worst case, when noise is present one-hundred percent of the time, the noise reduction system, according to the present invention, causes the input signal to be phase lagged the same amount of time as a conventional filter. However, under normal operation the phase lag provided by the noise reduction system, according to the present invention, is typically less than that of a conventional filter.

According to another embodiment of the present invention, the number of samples taken of an output signal (i.e., the filtered signal) is varied according to the magnitude of the difference signal. In this manner, the magnitude of the difference signal is used to modify the noise reduction system. As previously discussed, the filter of the noise reduction system can be implemented in hardware or software. When implemented in hardware, the noise reduction system can be implemented using only a few devices, such as an operational amplifier, a resistor, a capacitor and two analog (i.e., field effect transistors (FETs)) gates. Further, various inputs of the control system, such as a feedback or setpoint, may benefit from the noise reduction system, according to the present invention. According to the present invention, a less expensive, slower processor provides similar performance to that of a faster processor at virtually no additional cost, when the filter is implemented in software. A noise reduction system, according to the present invention, takes advantage of the fact that noise is often sporadic in nature and selectively provides filtering only when required.

A noise reduction system 100, according to an embodiment of the present invention, is depicted in FIG. 1. The system 100 includes a processor 102 coupled to a memory subsystem 104. The processor 102 and the memory subsystem 104 can be incorporated within a microcontroller 106, if desired. The processor 102 is also coupled to a switch (e.g., FET) 110 and a switch (e.g., a FET) 112. The processor 102 monitors an input signal (provided by, for example, an automotive sensor 10) at an input 107 of a low pass (LP) filter 108 and monitors an output signal at an output 109 of the filter 108. Based upon the measured signals and the various routines implemented, the processor 102 may actuate switch 110 such that the input signal is passed directly to an input 149 of a control system 150 or may deactuate the switch 110 and actuate switch 112, which causes the input signal to be provided through the filter 108 and the switch 112. In this manner, when the noise on an input signal at the input 107 of the filter 108 is greater than a desired value, the processor 102 causes the switch 110 to open and the input signal to be routed through the filter 108 and the switch 112.

When the noise level on the input signal is lower than a predetermined noise limit, the input signal is directly routed through the switch 110 to the input 149 of the control system 150. This is advantageous in that the additional phase lag that would be provided by the filter 108 does not result in the control system 150 delaying its response to the current input signal. However, there is a trade-off that occurs when the input noise level is greater than desired. In that case, the input signal is phase lagged by the filter 108 and, as a result, the control system 150 sees the input signal delayed by the frequency dependent phase lag of the filter 108.

Figure 2:
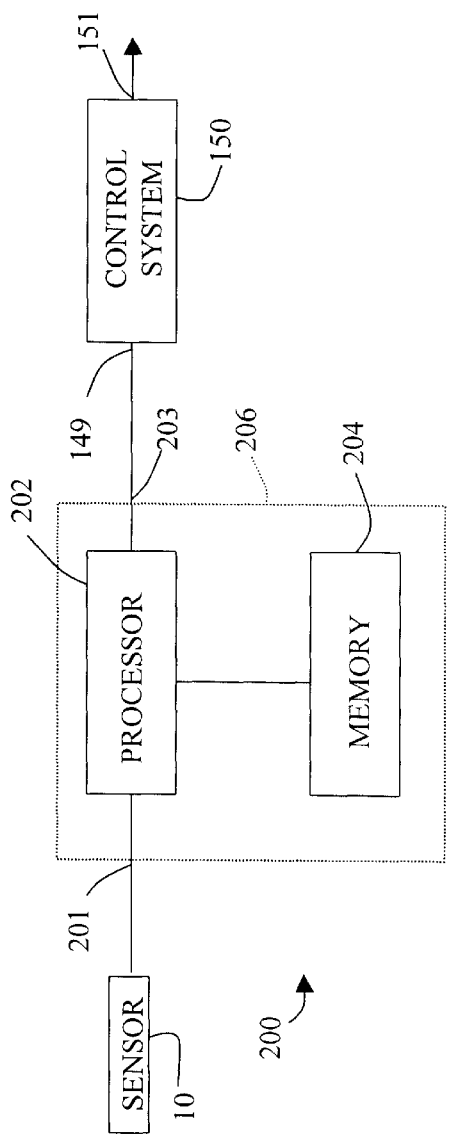
FIG. 2 is an electrical block diagram of a noise reduction system, according to another embodiment of the present invention.

Moving to FIG. 2, a noise reduction system 200 is illustrated that includes a processor 202, which implements a digital filter routine in software. The processor 202 monitors the input signal at an input 201 and performs a digital filter routine on the input signal to determine an output signal. Based upon the noise level (i.e., a difference signal) on the input signal, the processor 202 either provides the input signal or the digitally filtered input signal (i.e., an output signal) to the input 149 of the control system 150.

Figure 3A:
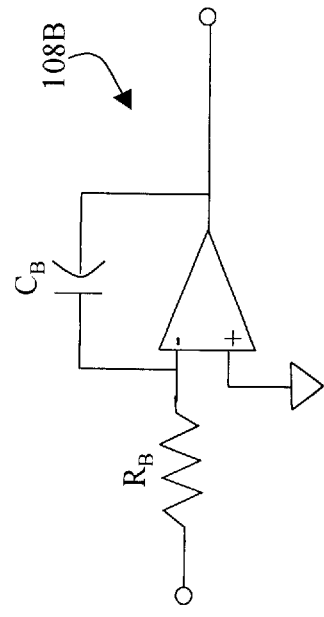
FIGS. 3A–3C are electrical schematics of exemplary filters that may be utilized in conjunction with the system of FIG. 1.
Figure 3C:
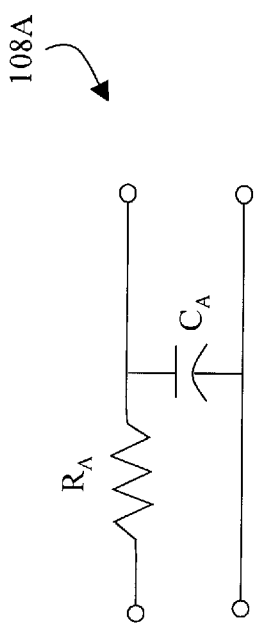
Figure 3B:
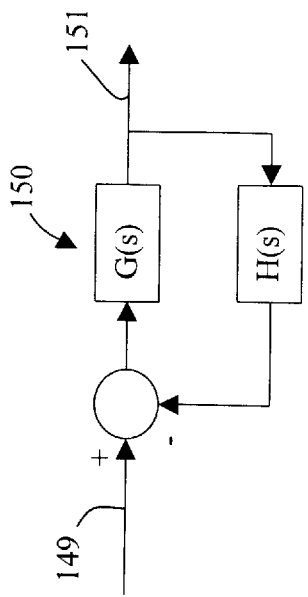
Figure 3D:
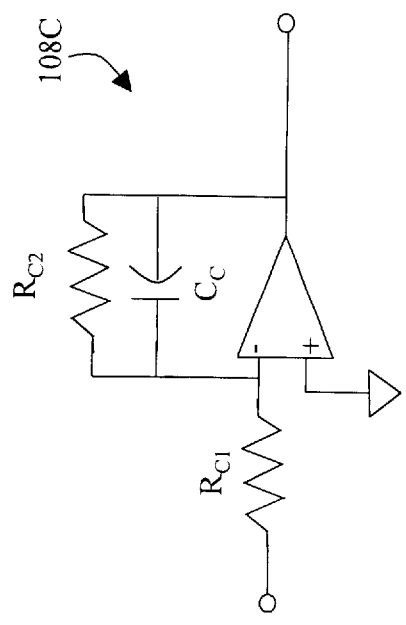
FIG. 3D illustrates a block diagram of an exemplary control system that may be utilized in conjunction with the system of FIGS. 1–2.

FIG. 3A depicts an electrical schematic of a passive LP filter that can be utilized with the embodiment of FIG. 1. FIGS. 3B–3C depict electrical schematics of an integrator and a leaking integrator, respectively, that can be utilized with the embodiment of FIG. 1. FIG. 3D illustrates an exemplary control system that has the following transfer function:

$$\frac{C(s)}{R(s)} = \frac{G(s)}{(1 + G(s)H(s))}$$

where C(s)=output as a frequency dependent function; R(s)=input as a frequency dependent function; G(s)=forward frequency dependent transfer function; and H(s)=feedback frequency dependent transfer function.

Figure 4:
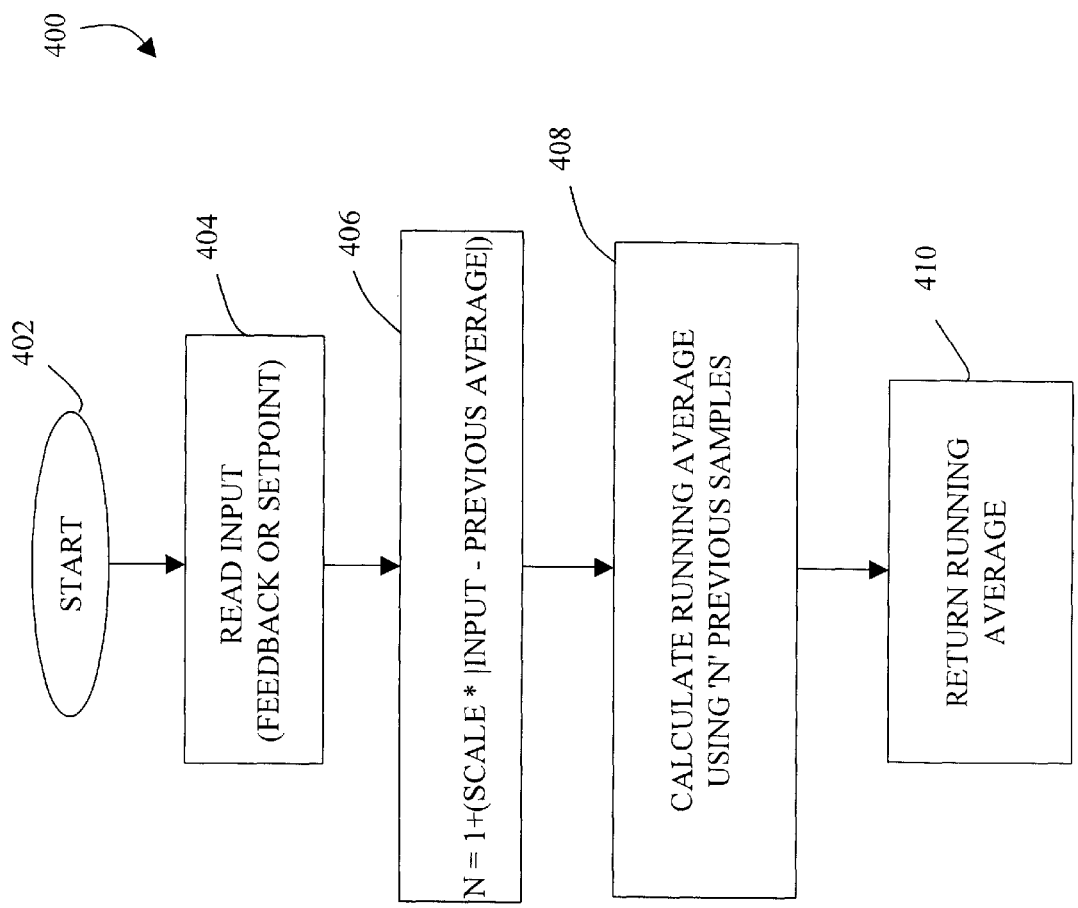
FIG. 4 is a flowchart of a sample routine that varies the number of samples utilized to determine the magnitude of the difference between an input signal level and an output signal level (i.e., a difference signal)

FIG. 4 depicts a sampling routine 400, which modifies the number of samples taken of an output signal based upon the difference between the input signal and a previous average of the output signal. For illustrative purposes, the discussion of FIG. 4 is made with reference to the noise reduction system 100 of FIG. 1. The routine 400 is initiated in step 402, at which point control transfers to step 404. In step 404, the processor 102 reads the level of an input signal at the input 107 of the system 100. Next, in step 406, the processor 102 determines the appropriate number of samples 'N', which is the magnitude of the difference between the input signal and the previous average of the output signal multiplied by a scale factor. To ensure that at least one sample is taken, a value of one may be added to the result. Then, in step 408, the processor 102 calculates a current running average of the output signal using the previous number of samples 'N' calculated in step 406. Next, in step 410, the routine 400 returns the running average to the calling program.

Filter embodiments that do not vary the number of samples taken provide either a one-hundred percent filtered value or a zero percent filtered value, similar to a digital signal (i.e., the filter is on or off). However, according to the embodiment of FIG. 4, the amount of filtering is continuously variable, where the number of samples 'N' utilized in running the average is varied, similar to an analog system. For example, when 'N=1', a raw value is passed. When 'N=2', a very small amount of filtering is used. Increased values of 'N', correspond to progressively larger amounts of filtering. It will be appreciated that, in many applications, it may be desirable to limit the number of samples (i.e., 'N') taken. Accordingly, the routine 400 typically allows the system 100 to reduce the amount of input signal filtering to its lowest effective value.

Figure 5:
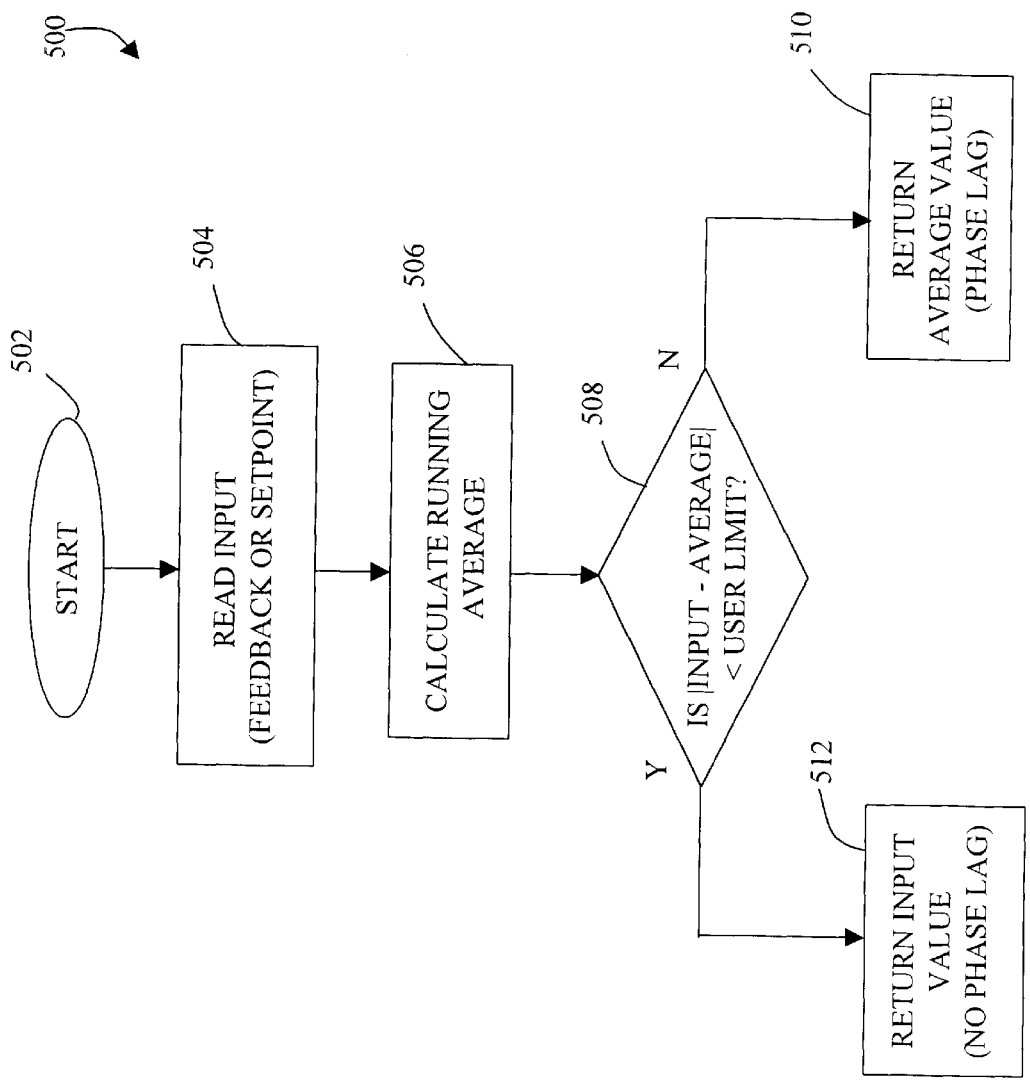
FIG. 5 is a flowchart of a sample routine that uses a fixed number of samples to determine the magnitude of a difference signal.

FIG. 5 depicts a sample routine 500 that determines whether an input signal provided to an input of a noise reduction system requires filtering. For illustrative purposes, the discussion of FIG. 5 is made with reference to the noise reduction system 100 of FIG. 1. The routine 500 is initiated in step 502 at which point control transfers to step 504. In step 504, the processor 102 reads the level of an input signal at the input 107 of the noise reduction system 100. Next, in step 506, the processor 102 calculates a running average of the filtered input signal using a fixed number of samples. Next, in decision step 508, the processor 102 determines whether the magnitude of the difference between the level of the input signal and the average of the output signal is less than a user limit (i.e., a predetermined noise limit). If so, control transfers from step 508 to step 512, where the routine 500 returns the input value to the calling program, which causes the input signal to be routed to the input 149 of the control system 150 through the switch 110. Otherwise, control transfers from step 508 to step 510 where the routine 500 returns the average value to the calling program, which causes the input signal to be filtered (i.e., routed through the filter 108 and the switch 112)

Accordingly, a noise reduction system has been described which reduces noise associated with an input signal provided to an input of a control system, while substantially minimizing the adverse affect on the responsiveness and stability of the control system. That is, the delay associated with filtering the input signal is only introduced if the level of the noise on the input signal is such that it requires filtering. In the event that the noise level is not of a sufficient level to require filtering, the phase lag associated with the filter is not introduced into the input signal. The noise reduction system is particularly advantageous when implemented in a motor vehicle, where noise is generated by a number of noise sources.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A method for reducing noise associated with an input signal provided to a control system while substantially minimizing the adverse affect on the responsiveness and stability of the control system, the method comprising the steps of:

determining an input signal level of an input signal at an input of a noise reduction system;

determining an output signal level of an output signal at an output of the noise reduction system;

determining a magnitude of a difference signal, wherein the difference signal is the difference between the input signal level and the output signal level;

providing the input signal to an input of a control system when the magnitude of the difference signal is less than a predetermined noise limit; and providing the output signal to the input of the control system when the magnitude of the difference signal is greater than or equal to the predetermined noise limit.

2. The method of claim 1, wherein the predetermined noise limit is one of a predetermined percentage of the output signal and a predetermined percentage of the input signal.

3. The method of claim 1, wherein the noise reduction system includes a noise filter that is implemented in hardware.

4. The method of claim 3, wherein the noise filter is a passive low pass filter.

5. The method of claim 3, wherein the noise filter is an active low pass filter.

6. The method of claim 1, wherein the noise reduction system includes a noise filter that is implemented in software.

7. The method of claim 6, wherein the noise filter is a low pass filter.

8. The method of claim 1, wherein the determined output signal level of the output signal is an average output signal level based on a predetermined number of samples.

9. The method of claim 8, wherein the predetermined number of samples utilized in determining the average output signal level is based on the magnitude of the difference signal.

10. A noise reduction system for reducing noise associated with an input signal provided to a control system while substantially minimizing the adverse affect on the responsiveness and stability of the control system, the system comprising:

a processor;

a memory subsystem coupled to the processor; and processor executable code for causing the processor to perform the steps of:

determining an input signal level of an input signal at an input of the noise reduction system;

determining an output signal level of an output signal at an output of the noise reduction system;

determining a magnitude of a difference signal, wherein the difference signal is the difference between the input signal level and the output signal level;

providing the input signal to an input of a control system when the magnitude of the difference signal is less than a predetermined noise limit; and providing the output signal to the input of the control system when the magnitude of the difference signal is greater than or equal to the predetermined noise limit.

11. The system of claim 10, wherein the predetermined noise limit is one of a predetermined percentage of the output signal and a predetermined percentage of the input signal.

12. The system of claim 10, wherein the noise reduction system includes a noise filter that is implemented in hardware.

13. The system of claim 12, wherein the noise filter is a passive low pass filter.

14. The system of claim 12, wherein the noise filter is an active low pass filter.

15. The system of claim 10, wherein the noise reduction system includes a noise filter that is implemented in software.

16. The system of claim 15, wherein the noise filter is a low pass filter.

17. The system of claim 10, wherein the determined output signal level of the output signal is an average output signal level based on a predetermined number of samples.

18. The system of claim 17, wherein the predetermined number of samples utilized in determining the average output signal level is based on the magnitude of the difference signal.

19. An automotive noise reduction system for reducing noise associated with an input signal provided to a control system while substantially minimizing the adverse affect on the responsiveness and stability of the control system, the system comprising:

a processor;

an automotive sensor coupled to the processor, the sensor providing an input signal;

a memory subsystem coupled to the processor; and processor executable code for causing the processor to perform the steps of:

determining an input signal level of the input signal at an input of the noise reduction system;

determining an output signal level of an output signal at an output of the noise reduction system;

determining a magnitude of a difference signal, wherein the difference signal is the difference between the input signal level and the output signal level;

providing the input signal to an input of an automotive control system when the magnitude of the difference signal is less than a predetermined noise limit; and providing the output signal to the input of the control system when the magnitude of the difference signal is greater than or equal to the predetermined noise limit.

20. The system of claim 19, wherein the predetermined noise limit is one of a predetermined percentage of the output signal and a predetermined percentage of the input signal.

21. The system of claim 19, wherein the noise reduction system includes a noise filter that is implemented in hardware.

22. The system of claim 21, wherein the noise filter is a passive low pass filter.

23. The system of claim 21, wherein the noise filter is an active low pass filter.

24. The system of claim 19, wherein the noise reduction system includes a noise filter that is implemented in software.

25. The system of claim 24, wherein the noise filter is a low pass filter.

26. The system of claim 19, wherein the determined output signal level of the output signal is an average output signal level based on a predetermined number of samples.

27. The system of claim 26, wherein the predetermined number of samples utilized in determining the average output signal level is based on the magnitude of the difference signal.

\* \* \* \* \*